(12) United States Patent
Kirchner et al.

(10) Patent No.: US 11,914,771 B2
(45) Date of Patent: Feb. 27, 2024

(54) SENSOR AND/OR INFORMATION DEVICE AS WELL AS SENSOR AND/OR INFORMATION SYSTEM

(71) Applicant: Workaround GmbH, Munich (DE)

(72) Inventors: Matthias Kirchner, Munich (DE); Sebastian Petruch, Munich (DE)

(73) Assignee: Workaround GmbH, Munich (DE)

( * ) Notice: Subject to any disclaimer, the term of this patent is extended or adjusted under 35 U.S.C. 154(b) by 353 days.

(21) Appl. No.: 17/194,793

(22) Filed: Mar. 8, 2021

(65) Prior Publication Data

US 2021/0278900 A1 Sep. 9, 2021

(30) Foreign Application Priority Data

Mar. 9, 2020 (DE) ...................... 10 2020 106 369.5

(51) Int. Cl.
| | |
|---|---|
| *G06F 3/01* | (2006.01) |
| *G06F 3/14* | (2006.01) |
| *G06K 7/10* | (2006.01) |
| *G06F 3/041* | (2006.01) |
| *G08C 17/02* | (2006.01) |
| *G06K 19/07* | (2006.01) |
| *G06K 7/14* | (2006.01) |

(52) U.S. Cl.
CPC ................ *G06F 3/014* (2013.01); *G06F 3/14* (2013.01); *G06K 7/10366* (2013.01); *G06K 7/1413* (2013.01); *G06K 19/0723* (2013.01); *G08C 17/02* (2013.01); *G06F 3/041* (2013.01); *G08C 2201/30* (2013.01)

(58) Field of Classification Search
CPC ...................................................... G06F 3/014
See application file for complete search history.

(56) References Cited

U.S. PATENT DOCUMENTS

| | | |
|---|---|---|
| 9,842,288 B1 | 12/2017 | Debates et al. |
| 10,948,989 B1* | 3/2021 | Blumenschein ........ G06F 3/011 |
| 2018/0335843 A1* | 11/2018 | Erivantcev ............ A63F 13/211 |
| 2020/0019245 A1* | 1/2020 | Ganadas ................. G06F 3/016 |

FOREIGN PATENT DOCUMENTS

DE 102015111506 A1 4/2016

\* cited by examiner

*Primary Examiner* — Daniell L Negron
(74) *Attorney, Agent, or Firm* — Dilworth IP, LLC

(57) ABSTRACT

A method for operating a system having a sensor and/or information device and a main device is described. The sensor and/or information device includes a hand garment and a secondary device, with at least one input mechanism. The main device is designed as a smart device. The method includes the following steps: An actuating signal is generated using the at least one input mechanism. The actuating signal is received by the secondary device, and an input signal is transmitted on the basis of the actuating signal by the secondary device to the main device. An action instruction is generated by way of a main device based on the input signal and based on a predefined action sequence. The action instruction is transmitted to the secondary device. Moreover, a sensor and/or information device, a sensor and/or information system as well as computer programme are described.

20 Claims, 2 Drawing Sheets

SENSOR AND/OR INFORMATION DEVICE AS WELL AS SENSOR AND/OR INFORMATION SYSTEM

FIELD OF THE DISCLOSURE

The disclosure relates to a method for operating a sensor and/or information system. The disclosure also relates to a sensor and/or information device as well as a sensor and/or information system.

BACKGROUND

Systems with wearable secondary devices, for example sensor modules, such as barcode scanners, or wearable display units with screens are known.

Such systems facilitate certain activities for a worker, for example packaging and shipment activities in a logistics centre or the assembly of individual components in an assembly line.

Wearable secondary devices typically have rather low computing power and small storage capacity in order to reduce power consumption and thus extend the operating time of the wearable secondary devices.

However, there are often many different types of tasks and activities that a worker must perform so that diverse requirements are placed on the systems. These requirements require in turn increased computing power and increased storage capacity so that a trade-off exists between operating time on the one hand and versatility on the other hand.

SUMMARY

Thus, a sensor and/or information system as well as a method for operating a sensor and/or information system is provided that ensures both prolonged operating time of the secondary device as well as versatile applicability.

For this purpose, a method for operating a sensor and/or information system, comprising a sensor and/or information device and a main device are provided. The sensor and/or information device comprises a hand garment, in particular a glove, and a secondary device, wherein the hand garment and/or the secondary device has or have at least one input means. The secondary device has a display and/or sensor unit and is attached to the hand garment. The main device is designed as a smart device, in particular a smart phone. The method comprises the following steps:
- generation of an actuating signal using said at least one input means;
- receipt of the actuating signal by the secondary device;
- transmission of an input signal on the basis of the actuating signal to the main device by the secondary device;
- generation of an action instruction by means of the main device based on the input signal and based on a predefined action sequence, wherein the action instruction is designed to cause the secondary device to execute a predefined action by means of the display and/or the sensor unit; and
- transmission of the action instruction to the secondary device.

The predefined action sequence comprises at least two predefined actions that are different from each other.

Within the scope of this disclosure, a "smart device" is understood to mean an electronic device comprising a computer processor and a data storage device on which an operating system is stored and is executable. Thus, different computer programs and applications are installable and executable on the smart device.

The smart device can be a wearable smart device, for example a smartphone, a tablet, a laptop, a smart watch or smart glasses. The smart device can also be a personal computer or a computer device linked to a cloud or a local network.

In the context of this disclosure, a "hand garment" is understood to be mean a garment that can be fastened firmly to the hand, wherein the garment covers the palm and dorsum of the hand at least partially and/or surrounds at least a finger annularly.

Within the scope of this disclosure, a hand garment is understood to mean not only a full glove with fingers but also a glove on which only bases for fingers are provided or individual fingers are missing, such as a finger stall, but also a glove that only surrounds parts of the hand, such as a covering or a bandage.

Moreover, a hand garment is also understood to mean a ring that can be worn on one or several fingers.

Examples of hand garments within the meaning of the disclosure are not only gloves, such as full gloves or gloves on which only bases for fingers are provided or individual fingers are missing, such as a finger stall, but also hand garments that only surround parts of the hand, such as a covering or a bandage. The hand garments can comprise a single piece or multiple pieces.

In particular, wrist bands that are worn on the wrist are not hand garments within the meaning of disclosure.

The method according to the disclosure is based on the fundamental idea of swapping compute-intensive processes, thus the generation of action instructions, from the secondary device to the main device. To this end, the input signal comprising information about the duration and/or type of actuation of the input means is only generated by the secondary device and therefore can be generated with limited computing and storage resources. In the simplest case, the input signal is the actuating signal.

As already described above, the main device is designed as a smart device and therefore has much greater computing power and storage capacity as well as a larger battery in comparison to the secondary device. Accordingly, the main device can complete compute-intensive tasks without the operating time of the sensor and/or information system being noticeably negatively impacted as a result. As a result, for example, the required battery capacity of the secondary device can be reduced so that the weight and costs of the secondary device are reduced.

After transmitting the action instruction to the secondary device, the secondary device can execute the predefined action.

The input signal can be the same as the actuating signal. In other words, the actuating signal is only then forwarded from the secondary device to the main device without being first processed further, thereby resulting in fewer computing resources being required.

However, the actuating signal can also be processed by the secondary device in order to generate the input signal. In this case, the input signal is a processed version of the actuating signal or the input signal is generated as a result of the actuating signal from the secondary device, but otherwise is uncorrelated to the actuating signal.

The action instruction comprises computer-readable instructions in the form of a data signal which can be processed by the secondary device.

The action sequence, based on which the action instruction is generated, comprises various process steps which must be completed and, in particular, the sequence in which these process steps must be completed, for example an assembly instruction for assembling components. The action instruction is generated therefore based on the process steps that now need to be completed so that the same actuation of the input means ultimately has a different effect depending on the situation and the process steps needing to be completed. In addition, the user can be taken through the operating procedure step by step by means of displaying the appropriate information.

Accordingly, a dynamic assignment of the input means is provided on the secondary device by means of the method according to the disclosure while only minimal computing resources of the secondary device are necessary as the assignment of the action being executed first occurs by means of the main device. In addition, the user does not have to hold the smart device in the hand between the individual process steps as the individual process steps are activated automatically in sequence. As a result, the operating procedure is made considerably easier as the user can always work with both hands free.

In this way, the operating procedures are predefined and standardized for the user. Moreover, quality assurance can be carried out using the action sequence as the user is informed about errors in the procedures immediately so that the user can resolve the error.

In particular, the action sequence is stored in a data storage device of the main device and/or is loaded onto this data storage device, for example from a database.

Of course, the action sequence can be processed on the main device by adding new actions, deleting existing actions and/or amending existing actions.

For example, the action sequence comprises a sequence of actions and/or a type of actuation for triggering one of the predefined actions. In other words, the individual process steps to be completed are stored together with the sequence in which these process steps must be executed. Alternatively or additionally, the individual process steps to be completed are stored together with the type of actuation with which the user can trigger the appropriate action.

One aspect of the disclosure provides that the action instruction is designed to activate the sensor unit, change an operating mode of the secondary device, change a function of at least one input means and/or to make the display show predefined information, in particular wherein the predefined information is contained in the action instruction. In other words, based on the input signal, the main device determines which function of the secondary device is required and/or is provided for executing the next process step and generates the operating procedures based on this.

The predefined information comprises, for example, instructions for a user of the sensor and/or information system that are related to the operating procedure and/or information about which process steps are to be done next. In other words, the sensor and/or information system according to the disclosure supports the user in the current process step by displaying the relevant information for at least this process step.

According to an embodiment of the disclosure, different actions are assigned to different input signals in the action sequence. "Different input signals" are understood to be mean such input signals that differ in type, duration and/or frequency of the actuation of at least one input means.

For example, several next steps are possible in a situation. The user can then select the next step via the type, duration and/or frequency of the actuation of at least one input means, in particular wherein the required type, duration and/or frequency of the actuation can be shown for each corresponding step on the display for the user.

In a further embodiment of the disclosure, the input signal is generated depending on the actuated input means and/or the type of actuation of the respective input means, in particular wherein the input signal is only then generated if said at least one input means is actuated twice. Accordingly, such input signals can differ from each other, being generated based on actuating signals different from each other.

A multiple actuation, in particular a double actuation of the input means as a prerequisite for generating the input signal reduces the probability that the user triggers the functions of the sensor and/or information system accidentally.

According to a further aspect of the disclosure, the hand garment and/or the secondary device has or have at least two input means, wherein input signals different from each other are assigned to said at least two input means. Another input signal and accordingly also another action instruction can be generated depending on which of said at least two input means is actuated. In other words, another predefined action can be executed depending on which of said at least two input means is actuated.

To this end, said at least two input means can be provided on the hand garment. Alternatively, said at least two input means can also be provided on the secondary device. Alternatively, the hand garment and the secondary device can each have at least one input means.

A further aspect of the disclosure provides that the action instruction, in particular the function assigned to the action instruction, is generated by the main device depending on the situation. The term "depending on the situation" is understood to mean that previously executed actions and/or other data obtained by the secondary device, e.g. photos, scanned codes etc, are taken into consideration. Accordingly, the same actuation of the same input means in situations different from each other can lead to actions different from each other that are executed by the secondary device. It is a dynamic assignment of at least one input means that is controlled by the main device.

The action instruction can also be generated based on at least one prerequisite. An example of such a prerequisite is that the previous process step has been completed correctly. Another example of such a prerequisite is that a user stays in a certain area, for example in the proximity of a certain machine or a certain storage rack. The position of the user can be determined using suitable sensors of the glove, the secondary device and/or the main device.

Said at least one prerequisite can be stored in a predefined action sequence. To this end, predefined actions different from each other can have prerequisites different from each other.

A further aspect of the disclosure provides that said at least one prerequisite comprises one accepted response to a previous action from the action sequence. In this way, the quality of the process executed by the user can be increased considerably.

For example, an accepted response can be a certain input signal, e.g. the actuation of a certain input means, and/or that the input signal fulfils certain criteria. In this regard, it is conceivable that a scanned code is compared with a data status of an enterprise-resource-planning system or for feasibility by the main device and the response (thus here the input signal) is first deemed to be accepted upon a positive check.

In particular, the next action can be blocked, i.e. not executed, if the previous action has not yet been completed successfully or if afterwards there has not been an accepted response. An appropriate error message can be shown on the display, with said error message the user is prompted to first complete the previous action, i.e. to generate the accepted response, before the next action can be executed.

In a further embodiment of the disclosure, the input signal and/or the action instruction is or are transmitted wirelessly, in particular using Bluetooth, preferably using Bluetooth Low Energy. Bluetooth, in particular Bluetooth Low Energy enables data to be exchanged in an energy-efficient manner, thus increasing the battery life of at least the secondary devices.

The object is also solved according to the disclosure by means of a sensor and/or information device comprising a hand garment, in particular a glove, and a secondary device, wherein the secondary device is attached to the hand garment. The hand garment and/or the secondary device has or have at least one input means. The secondary device comprises a display and/or a sensor unit as well as a control unit. The control unit is designed to receive an actuating signal from said at least one input means, to transmit an input signal on the basis of the actuating signal to the main device, to receive an action instruction based on a predefined action sequence from the main device, wherein the action instruction is configured to make the secondary device execute a predefined action, and to control the display and/or sensor unit based on the action instruction so that the predefined action assigned to the action instruction is executed. The predefined action sequence comprises at least two predefined actions that are different from each other.

In particular, the control unit of the sensor module is an embedded system. Thus, no complete operating system or similar is run on the control unit of the sensor module; rather, the control unit is configured to process received signals and data according to fixed rules or algorithms.

As to the advantages and further characteristics of the sensor and/or information device, reference is made to the above explanations regarding the method, which also apply to the sensor and/or information device and vice versa.

In particular, the action sequence comprises a sequence of actions and/or a type of actuation for triggering one of the predefined actions. In other words, the individual process steps to be completed are stored together with the sequence in which these process steps must be executed. Alternatively or additionally, the individual process steps to be completed are stored together with the type of actuation by means of which the user can trigger the appropriate action.

Preferably, the sensor unit comprises a scanner, a camera and/or a RFID sensor. For example, the scanner can be a barcode scanner or a QR-code scanner. The sensor unit can comprise several sensors, thus for example both a scanner and a camera.

The display can be designed as an input means, in particular as a touch display. Accordingly, the user of the sensor and/or input device can trigger an actuating signal by tapping, swiping and/or another action on the touch display.

Said at least one input means can however be installed on the sensor unit, in particular on a scanner and/or a camera of the sensor unit.

At least two different input means can be provided on the sensor unit, for example, two buttons.

A further aspect of the disclosure provides that said at least one input means comprises an electrical functional element that is installed on the hand garment and connected to the secondary device via a cable, in particular wherein the functional element has a touch sensor, a pressure sensor, a button, a switch, a capacitive and/or inductive sensor surface, a reading device and/or an LED.

The object is also solved according to the disclosure by a sensor and/or information system comprising a sensor and/or or information device described above and a main device, wherein the main device is designed as a smart device, in particular a smartphone. The main device is configured to receive input signals and generate the action instruction based on the input signal. In particular, the sensor and/or information system is designed to execute the method described above.

As to the advantages and characteristics of the sensor and/or information system, reference is made to the above explanations regarding the method for operating a sensor and/or information system as well as the explanations regarding the sensor and/or information device, which also apply to the sensor and/or information system and vice versa.

An aspect of the disclosure provides that the main device has a data storage device and/or is connected to a data storage device, in which a predefined action sequence is stored, wherein the predefined action sequence comprises at least two predefined actions different from each other.

The predefined action sequence is thus stored, in particular, on the wearable main device that the user of the sensor and/or information system carries with him. Alternatively or additionally, the predefined action sequence can be stored on a stationary main device.

In particular, the predefined action sequence comes from an enterprise-resource-planning system (ERP system), in which all relevant process steps as well as their sequence are defined and stored. The predefined action sequence can then be transmitted from the ERP system to the (wearable) main device of the user. Of course, the action sequence can be processed on the main device by adding new actions, deleting existing actions and/or amending existing actions.

The ERP system can comprise an inventory management system.

Moreover, several different action sequences can be stored in the storage device of the main device; said action sequences corresponding to different working processes. Even in this case, new action sequences can be added, existing action sequences can be deleted and/or existing action sequences can be amended.

The object is also solved according to the disclosure by means of a computer programme for the sensor and/or information system described above. The computer programme comprises a first computer programme module and a second computer programme module, wherein the computer programme comprises programme code means that are configured to make the sensor and/or information system execute a method described above if the first computer programme module is executed on a computing unit of the control unit of the secondary device and the second computer programme module is executed on a computing unit of the main device.

Here and in the following, "programme code means" are understood to be computer-executable instructions in the form of programme code and/or programme code modules in compiled and/or uncompiled form that can exist in any programme language and/or machine language.

As to the advantages and further characteristics of the computer programme, reference is made to the above explanations regarding the method for operating a sensor and/or information system as well as the explanations regarding the sensor and/or information device, which also apply to the sensor and/or information system and vice versa.

BRIEF DESCRIPTION OF THE DRAWINGS

Additional advantages and characteristics of the disclosure can be found in the following description as well as in the attached drawings to which reference is made. In these.

DETAILED DESCRIPTION

Lists having a plurality of alternatives connected by "and/or", for example "A, B and/or C" are to be understood to disclose an arbitrary combination of the alternatives, i.e. the lists are to be read as "A and/or B and/or C". The same holds true for listings with more than two items.

Figure 1:
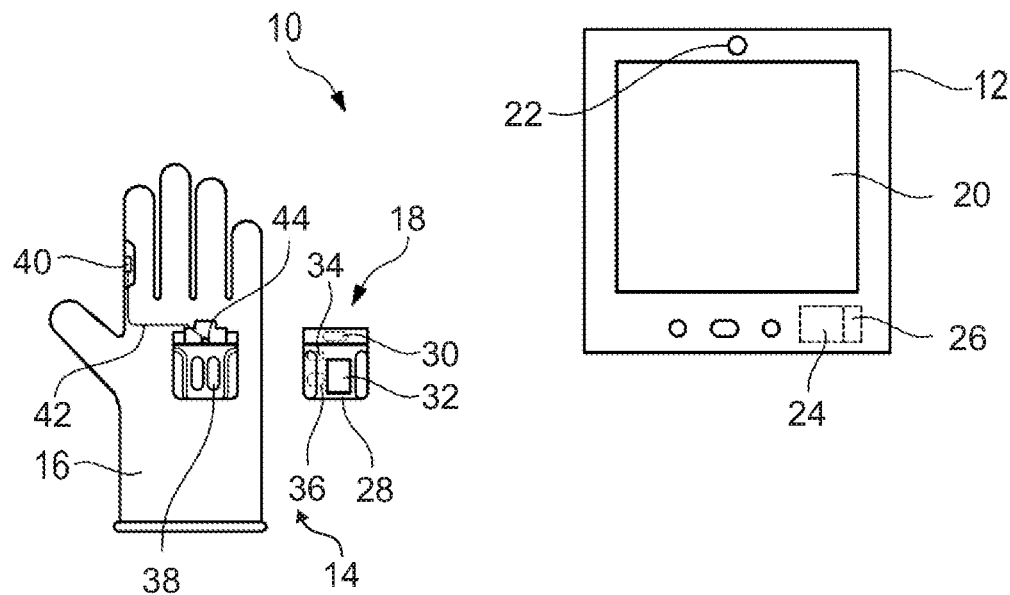
FIG. 1 shows a sensor and/or information system according to the disclosure in an unworn condition.

FIG. 1 schematically shows a sensor and/or information system 10 comprising a main device 12 and a sensor and/or information device 14.

The sensor and/or information device 14 comprises a hand garment 16, more specifically a glove, as well as a secondary device 18.

The sensor and/or information system 10 is designed for industrial use and therefore is suitably robust for continuous operation.

The main device 12 is a wearable smart device, preferably a smartphone. However, the main device 12 can also be a tablet, a laptop, a smart watch or smart glasses.

Figure 2:
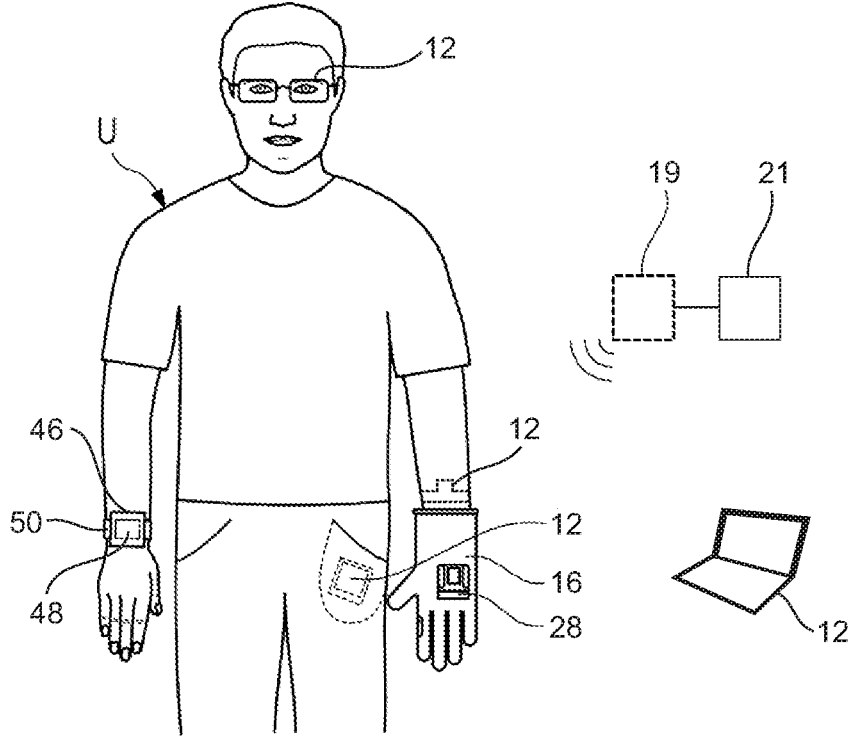
FIG. 2 shows the sensor and/or information system of FIG. 1 while being worn by a user.

Instead of the wearable main device 12, a stationary main device 19 could also be provided in principle, in particular a stationary computer. The use of a cloud server as a stationary main device 19 is also conceivable. The mentioned stationary main devices 19 are shown in FIG. 2 as dashed lines.

Such a stationary main device 19 can also be provided in addition to the wearable main device 12.

Each respective main device 12, 19 can be connected to a database 21, such as an enterprise-resource-planning system (ERP system), for example on a local server or a cloud server, and can write data in or obtain data from the database or the ERP system.

The main device 12 has a display 20, a camera 22 as well as a control unit 24.

The control unit 24 has a communication module 26. The communication module 26 is configured to communicate wirelessly with the secondary device 18.

For example, the communication module 26 is configured to communicate with the secondary device 14 via Bluetooth, in particular Bluetooth Low Energy, and/or via WLAN.

The control unit 24 has an operating system on which an application of the sensor and/or information system 10 is executed.

In the shown embodiment, the secondary device 18 of the sensor and/or information system 10 is a sensor module 28.

It should be noted, however, that this embodiment is purely exemplary for illustration purposes. Alternatively, the secondary device 18 can also be designed as a display module that simply has a display for displaying information.

The sensor module 28 has an optical reading unit 30, which is a barcode scanner in the shown embodiment, and a display 32 and a control unit 34 comprising a communication module 36.

The sensor module 28 has a battery or more specifically an accumulator for power supply.

It is also conceivable that the sensor module 28 has other sensor units, such as an RFID reader, a camera, touch sensors or acceleration sensors in addition to or instead of the optical reading unit 30.

In general, the control unit 34 of the sensor module 28 has considerably lower computing power and a considerably smaller storage capacity than the control unit 24 of the main device 12.

In particular, the control unit 34 of the sensor module 28 is an embedded system. For example, no complete operating system or similar is run on the control unit 34 of the sensor module 28; rather, the control unit 34 is configured to process received signals and data according to fixed rules or algorithms.

The communication module 36 is configured to communicate wirelessly with the main device 12, more specifically with the communication module 26 of the main device 12, preferably via Bluetooth, in particular Bluetooth Low Energy, and/or via WLAN.

The stationary main device 19 is connected to the main device 12 in a signal-transmitting manner, preferably via WLAN and/or Bluetooth, in particular Bluetooth Low Energy.

As shown in FIG. 2, the sensor module 28 can be fastened to the body of a user U by means of the glove 16. The secondary device 18, or rather the combination of the glove 16 and the secondary device 18 is thus what is termed a "wearable".

For this purpose, the glove 16 has a holder or receptacle 38 in which the sensor module 28 can be fastened and removed in a repeatable manner without tools.

The glove 16 can also have an input means 40, for example a button for the secondary device 14. The button or input means 40 can be provided on a finger of the glove 16. It is also conceivable that said at least one input means 40 or one or several further input means 40 are provided on the receptacle 38.

The input means 40 is connected to the secondary device 18 as soon as it is inserted in the receptacle 38 by means of at least a cable 42 and contact elements 44 in the receptacle 38.

Alternatively or in addition to the input means 40 on the glove 16, the display 32 of the secondary device 18 can be designed as an input means. For example, the display 32 is designed as a touch display.

Said at least one input means 40 can also be provided on the sensor module 28. In particular, the sensor module 28 can have at least two separate input means 40. For example, two or more buttons are provided on the holder or receptacle 38.

As a result, different types of actuation of the sensor and/or information device are possible. For example, a first type of actuation is a single actuation of the button in the glove 16, a second type of actuation is a double actuation of the button in the glove 16 ("double click") and a third type of actuation is double tapping on the display 32 ("double tap").

Optionally, the secondary device 18 and/or the glove 16 can have at least one further sensor that is designed as an input means. For example, said at least one further sensor can be an acceleration sensor that is configured to detect a shake or jerk of the hand of the user U.

Optionally, the sensor and/or information system 10 can also have a display module 46 comprising a display 48. The display module 46 is, for example, attached to a wrist band 50 so that it can be worn by the user U on the arm or wrist.

Analogous to the sensor module 28, the display module 46 is connected to the main device 12 in a signal-transmitting manner, preferably via Bluetooth, in particular via Bluetooth Low Energy, and/or via WLAN.

At the start of a shift, the user U and each of the his colleagues take at least one secondary device 18 corresponding to his task and, if necessary, one wearable main device 12 from one corresponding charging stations.

For example, the user U is an assembly worker in production or a logistics worker in a warehouse.

At the end of each shift at the latest, the user U puts the secondary devices 18 and the main device 12 back into the corresponding charging station.

In the charging station, the secondary devices 18 are not assigned to any of the main devices 12 so that the sensor and/or information systems 10 can be selected from any device 12, 18. The user U can therefore take any main device 12 and any secondary device 18 that is suitable for his task.

Once the user U has taken the appropriate secondary device 18 and the appropriate main device 12 from the charging station, the secondary device 18 and the main device 12 are coupled together, wherein an unambiguous assignment is established between the secondary device 18 and the main device 12.

Figure 3:
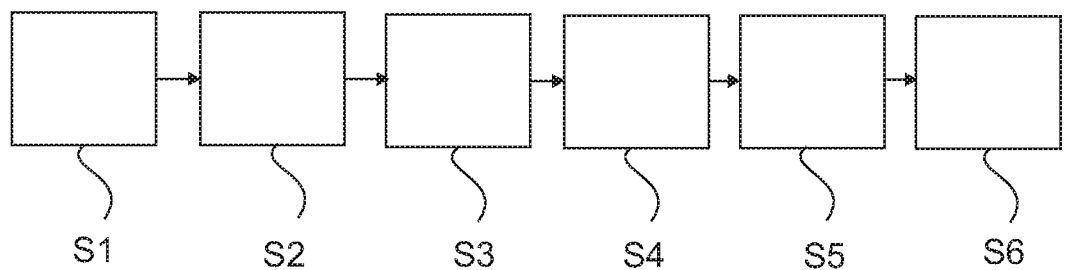
FIG. 3 shows a flow diagram of a method according to the disclosure.

The sensor and/or information system 10 is designed to execute the method described in the following by means of the FIG. 3.

In particular, the sensor and/or information system 10 comprises a computer programme, or rather a computer programme system comprising a first computer programme module and a second computer programme module. The first computer programme module and the second computer programme module each comprise programme code means that are configured to make the sensor and/or information system 10 execute the method as described below if the first computer programme module is executed on a computing unit of the control unit 34 of the secondary device 18 and the second computer module is executed on a computing unit of the control unit 24 of the main device 12.

For a better understanding, the individual steps of the method are each illustrated in more detail in the following by means of a concrete working situation, namely an assembly of a device comprising several single components by the user U. Of course, the possible applications of the sensor and/or information system 10 are not only limited to this concrete working situation.

If the user U actuates the input means 40, an actuating signal is generated by the input means 40 and transmitted to the secondary device 18, more specifically to the sensor module 28 (step S1).

To this end, the actuating signal is transmitted to the control unit 24 and/or the communication module 26 of the secondary device 18.

In the aforementioned working situation, the user U would actuate the input means 40 for example once or several times in order to begin with the assembly of the device.

The secondary device 18 receives the actuating signal and transmits an input signal based on the actuating signal to the main device 12 via the communication module 36 (step S2).

To this end, the input signal can be same as the actuating signal. In other words, the actuating signal is only then forwarded from the secondary device 18 to the main device 12, without being processed further beforehand.

Alternatively, the control unit 24 can process the actuating signal in order to generate the input signal. In this case, the input signal matches a processed version of the actuating signal, or the input signal is generated as a result of the actuating signal from the control unit 34 of the secondary device 18, but otherwise is uncorrelated to the actuating signal.

In particular, the input signal is only generated by the control unit 34 and transmitted to the main device 12 in the case of a predefined type of actuating signal, for example only in the event of a double actuation of the input means.

In addition, input signals different from each other can also be generated and transmitted based on different actuating signals that derive from different input means.

Accordingly, an input signal that is generated after actuating the input means 40 on the glove 16 can be distinguished from another input signal that is generated after actuating the touch display 32.

The input signal contains, for example, information about which input means has been actuated and the type of actuation. The type of actuation can contain information about the actuated input means 40 (e.g. button in the glove 16, touch of the display), the duration (e.g. "long", "short") and/or the number of successive actuations (e.g. "single", "double", "triple").

The input signal is received by the main device 12 via the communication module 26 and processed by the control unit 24 of the main device 12. The control unit 24 generates an action instruction based on the input signal received (step S3).

The action instruction is computer-readable instructions in the form of a data signal which can be processed by the control unit 34 of the secondary device 18. Generally speaking, the action instructions are configured to make the secondary unit 18 execute the predefined action.

The predefined action comprises, for example, at least one command to the secondary device 18 from the following group: activate sensor unit, change operating mode of the secondary device 18, change function of the input means 40 and show predefined information on the display 32.

To this end, the predefined information can be contained in the action instruction or already be stored in the secondary device 18.

Figure 4:
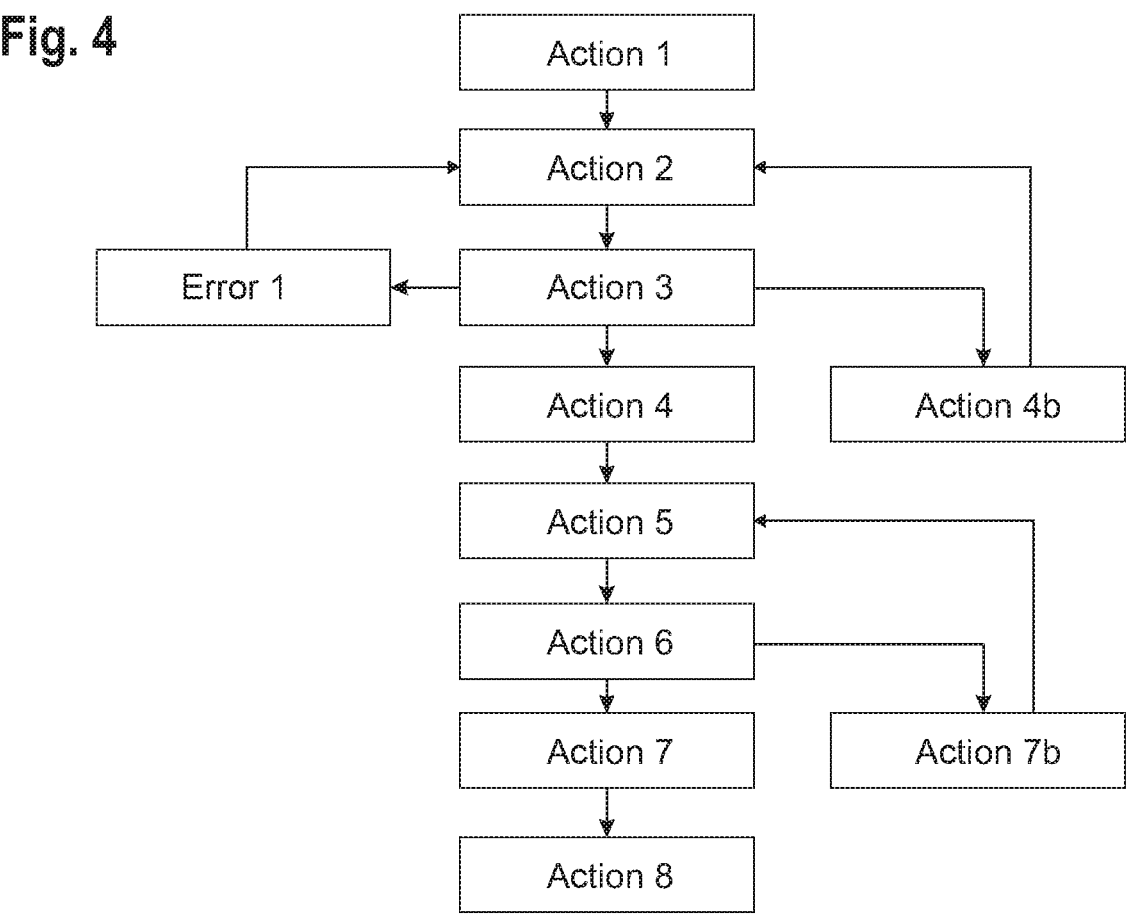
FIG. 4 shows a diagram of an action sequence.

For this purpose, an action sequence (see FIG. 4) comprising information about the different actions to be executed as well as their sequence is stored in a storage device of the main device 12.

In addition, the action sequence includes information on which type of input signal is linked to which action to be executed.

For example, the action sequence comes from the database 21 or the ERP system in which it is stored.

The action sequence can be adapted both in the database 21 and on the main device 12, 19. For example, it can be adapted or predefined by an administrator, integrator and/or a group leader. In particular, in the case of an adaptation of the action sequence in the database 21, the action sequence is adapted once centrally for numerous main devices 12, 19.

Of course, the action sequence can be processed on the main device 12 by the user U by adding new actions, deleting existing actions and/or amending existing actions.

In other words, different input signals are thus linked to different actions to be executed, wherein the action to be executed also depends on the actions already executed.

In the aforementioned working situation, the action sequence could be as follows:

action 1: activate optical reading unit 30 and show the following information on the display 32: "Please scan component A", action 2: trigger optical reading unit 30, action 3: show information on the display 32: "Please assemble component A and confirm", action 4: show information on the display 32: "Please scan component B", action 5: trigger optical reading unit 30, action 6: show information on the display 32: "Please assemble component B and confirm", action 7: deactivate optical reading unit 30, activate camera and show information on the display 32: "Please photograph assembled device", Action 8: trigger camera.

Each generated action instruction is then transmitted to the secondary device 18 via the communication module 26 and the secondary device 18 executes the respective action (step S4).

In the aforementioned example, the optical reading unit 30 of the sensor module 28 is initially activated and the information "please scan component A" is shown on the display 32 (action 1).

The user U can now trigger action 2, scanning using the optical reading unit 30, by a further actuation of the input means 40.

Based on this further actuation of the input means 40, a further input signal is generated and optionally, at least in the aforementioned example, transmitted to the main device 12 together with a data signal of the optical reading unit 30 which contains the appropriate scanned information (step S5).

Based on this further input signal, the main device 12 generates a further action instruction according to action 3 analogous to the aforementioned method (step S6).

The user U now assembles the component and confirms the assembly by actuating the input means 40.

As a response to this confirmation, more specifically the corresponding input signal, the main device 12 generates a further action instruction according to action 4 analogous to the aforementioned method.

This system is repeated until all the actions of the action sequence have been performed.

If necessary, the control unit 24 of the main device 12 compares additional data obtained from the secondary unit 18, for example the aforementioned data signal of the optical reading unit 30, with further prerequisites that are stored in the action sequence. Moreover, the main device 12 can check the operating procedure. In the aforementioned working situation, for example, the main device 12 checks whether the component scanned as a result of action 2 really is component A before the action instruction for the aforementioned action 3 is generated and transmitted to the secondary device 18.

The main device 12 can block, if necessary, the execution of further actions of the action sequence as long as the further prerequisites are not fulfilled and/or as long as the previous action has not been correctly completed by means of an accepted response.

For example, an accepted response can be a certain input signal, e.g. the actuation of a certain input means 40, and/or that the input signal fulfils certain criteria. In this regard, it is conceivable that a scanned code, as previously described, is compared with a data status of an ERP system and/or for feasibility by the main device 12 and the response (thus here the input signal) is first deemed to be accepted upon a positive check.

Alternatively or additionally, a further prerequisite can be provided that the user stays in a certain area, for example in the proximity of a certain machine or a certain storage rack.

For this purpose, the hand garment 16, the secondary device 18 and/or the wearable main device 12 can have one or more motion trackers.

If the further prerequisite is not fulfilled, thus it is not the component A, an error message (error 1) can be generated, transmitted to secondary device 12 and shown on the display 32.

For this purpose, the action sequence can have different branches.

Based on these further action instructions, the appropriate information to scan the correct component A is now shown to the user U on the display 32.

In the case of a further actuation of the input means 40, action 3 is not executed then, but rather action 2 is executed in order to enable the user U to scan anew.

This procedure is repeated until the user U finishes the work and/or the last action in the action sequence is executed.

The action instruction is therefore generated depending on the situation, thus depending on a current task of the user U, depending on the type of input signal and/or based on process steps already executed.

It is also conceivable that the action sequence has several branches in which the user U can alternate as a result of another type of actuation of the input means. Which type of actuation, more specifically which input signal leads to which the next action, is then stored in the action sequence.

For example, the aforementioned action sequence can have the actions 4b and 7b as alternatives to actions 4 and 7.

Thus, the user U has two possibilities each after action 3 and 6. On the one hand, the user U can execute the actions 4 and 7 by means of a first type of actuation of the actuating means 40, e.g. a single, short actuation of the button in the glove 16. On the other hand, the user U can trigger the actions 4b and 7 by means of another type of actuation, e.g. double, rapid tapping on the display ("double tap"). The main device 12 recognises which action is desired based on the different input signals.

In the example mentioned, the user U can thus scan a component anew, e.g. as the user U has detected damage on the component initially scanned and does not want to use it as a result.

Of course, the action instruction can also be generated depending on the type of secondary device 18, for example based on which type of sensor the sensor module 28 has and/or based on whether the secondary unit 18 has a display.

Action instructions that depend on the situation are also possible outside of an action sequence. These can be influenced by further information that the main device 12 obtains, for example from a control centre.

The main device 12, or rather the software installed on it, leads the user U through the entire working process that is defined by the action sequence.

In each individual process step, the information required for each process step is shown to the user U on the display 32 and the user U can confirm and/or execute the individual process steps by actuating the input means 40.

Of course, the action sequence can be processed on the main device 12 by adding new actions, deleting existing actions and/or amending existing actions.

Of course, several different action sequences corresponding to different working processes can be stored in the storage device of the main device 12. Even in this case, new action sequences can be added, existing action sequences can be deleted and/or existing action sequences can be amended.

It is also conceivable that the sensor and/or information system 10 is used for a continuous inventory, wherein the inventory can be integrated into the operating procedure.

The actions required for the inventory can be stored in the action sequence together with the actions required for the other process steps.

In the aforementioned example for the action sequence, an additional action can be inserted before each of the actions 1 and 4, by means of said additional action the user is prompted to compare the number of components actually still available with the number of components stored in the ERP system.

Specifically, before the action 1, an action 1b could therefore be provided that is as follows:

Action 1b: show information on the display: "Number of components stored in the ERP system is 5. Please count components A and confirm or correct the number 5.

Subsequently, the user U can confirm or correct the number of components A stored in the ERP system by actuating the input means 40 accordingly.

The invention claimed is:

1. A method for operating a system, the system comprising a wearable and a main device, wherein the wearable comprises a hand garment and a secondary device,
   wherein at least one of the hand garment and the secondary device has or have at least one input means, wherein the secondary device comprises at least one of a display and a sensor unit, wherein the secondary device is attached to the hand garment, and
   wherein the main device is smart device, the method comprising steps of:
   generation of an actuating signal using said at least one input means,
   receipt of the actuating signal by the secondary device;
   transmission of an input signal based on the actuating signal to the main device by the secondary device;
   generation of an action instruction by means of the main device based on the input signal and based on a predefined action sequence, wherein the action instruction is configured to make the secondary device execute a predefined action by means of at least one of the display and the sensor unit; and
   transmission of the action instruction to the secondary device;
   wherein the predefined action sequence comprises at least two predefined actions different from each other.

2. The method according to claim 1, wherein the action sequence comprises at least one of a sequence of actions and a type of actuation for triggering one of the predefined actions.

3. The method according to claim 1, wherein the action instruction is configured to at least one of activate the sensor unit, change an operating mode of the secondary device, change a function of at least one input means and make the display show predefined information.

4. The method according to claim 3, wherein the predefined information is contained in the action instruction.

5. The method according to claim 1, wherein different actions are assigned to different input signals in the action sequence.

6. The method according to claim 1, wherein the input signal is generated depending on at least one of the actuated input means and a type of actuation of the respective input means.

7. The method according to claim 1, wherein the input signal is only then generated if said at least one input means is actuated twice.

8. The method according to claim 1, wherein at least one of the hand garment and the secondary device has or have at least two input means, wherein input signals different from each other are assigned to said at least two input means.

9. The method according to claim 1, wherein the action instruction is generated by the main device depending on a situation.

10. The method according to claim 9, wherein a function assigned to the action instruction is generated by the main device depending on the situation.

11. The method according to claim 1, wherein the action instruction is generated based on at least one prerequisite.

12. The method according to claim 11, wherein said at least one prerequisite comprises an accepted response to a previous action from the action sequence.

13. The method according to claim 1, wherein at least one of the input signal and the action instruction are transmitted wirelessly.

14. A wearable comprising a hand garment and a secondary device, wherein the secondary device is attached to the hand garment, wherein at least one of the hand garment and the secondary device has or have an input means, wherein the secondary device has at least one of a display and a sensor unit as well as a control unit, wherein the control unit is configured to:
    receive an actuating signal from said at least one input means,
    transmit an input signal based on the actuating signal to a main device,
    receive an action instruction based on a predefined action sequence from the main device, wherein the action instruction is configured to make the secondary device execute a predefined action, and
    control at least one of the display and sensor unit based on the action instruction so that the predefined action assigned to the action instruction is executed,
    wherein the predefined action sequence comprises at least two predefined actions different from each other.

15. The device according to claim 14, wherein the action sequence comprises at least one of a sequence of actions and a type of actuation for triggering one of the predefined actions.

16. The device according to claim 14, wherein the sensor unit comprises at least one of a scanner, a camera and a RFID sensor.

17. The device according to claim 14, wherein the display is an input means.

18. The device according to claim 14, wherein said at least one input means comprises an electrical functional element that is installed on the hand garment and connected to the secondary device via a cable.

19. A system comprising a wearable and a main device, wherein the main device is a smart device,
    wherein the wearable device comprises a hand garment and a secondary device, wherein the secondary device is attached to the hand garment, wherein at least one of the hand garment and the secondary device has or have an input means, wherein the secondary device has at least one of a display and a sensor unit as well as a control unit, wherein the control unit is configured to:
    receive an actuating signal from said at least one input means,
    transmit an input signal based on the actuating signal to the main device, receive an action instruction based on a predefined action sequence from the main device, wherein the action instruction is configured to make the secondary device execute a predefined action, and control at least one of the display and sensor unit based on the action instruction so that the predefined action assigned to the action instruction is executed, wherein the predefined action sequence comprises at least two predefined actions different from each other;

wherein the main device is configured to receive input signals and to generate the action instruction based on the input signal.

20. The system according to claim 19, wherein the main device has a data storage device or the main device is connected to a data storage device, in which the predefined action sequence is stored.

* * * * *